(12) United States Patent
Amitay et al.

(10) Patent No.: US 6,412,732 B1
(45) Date of Patent: Jul. 2, 2002

(54) APPARATUS AND METHOD FOR ENHANCEMENT OF AERODYNAMIC PERFORMANCE BY USING PULSE EXCITATION CONTROL

(75) Inventors: Michael Amitay, Marietta; Ari Glezer, Atlanta, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/610,896

(22) Filed: Jul. 6, 2000

Related U.S. Application Data
(60) Provisional application No. 60/142,474, filed on Jul. 6, 1999.

(51) Int. Cl.⁷ .............................................. B64C 21/08
(52) U.S. Cl. ........................ 244/208; 244/199; 244/200
(58) Field of Search ................................ 244/205, 198, 244/208, 214, 204, 201, 207, 199, 200

(56) References Cited

U.S. PATENT DOCUMENTS

| | | | | |
|---|---|---|---|---|
| 5,040,560 A | * | 8/1991 | Glezer et al. | 137/13 |
| 5,758,823 A | * | 6/1998 | Glezer et al. | 239/4 |
| 5,957,413 A | * | 9/1999 | Glezer et al. | 244/208 |
| 6,056,204 A | * | 5/2000 | Glezer et al. | 239/8 |

* cited by examiner

Primary Examiner—Peter M. Poon
Assistant Examiner—Timothy D. Collins
(74) Attorney, Agent, or Firm—Thomas, Kayden, Horstemeyer & Risley

(57) ABSTRACT

One aspect of the apparatus disclosed herein is a system for modifying an aerodynamic property of an aerodynamic surface in a fluid flow. The fluid flow could comprise a free stream fluid flow, or an internal fluid flow, such as in a nozzle, diffuser, or compressor. The system of the preferred embodiment comprises a synthetic jet actuator embedded in an aerodynamic surface. In one aspect, the aerodynamic surface may be a wing. The synthetic jet actuator typically has a jet housing defining a chamber, where the chamber is in fluid communication with the fluid. This fluid communication may be accomplished via an orifice in a wall of the housing. Additionally, a portion of said housing is preferably moveable such that the volume of the chamber can be adjusted. The system also comprises a device for changing the position of the moveable portion of the housing at a predefined frequency. In this way, the synthetic jet actuator is pulse modulated in order to enhance the synthetic jet actuator's performance. In another aspect, the invention may be seen as a method of controlling a synthetic jet actuator. The method preferably comprises the steps of driving a synthetic jet actuator at a first frequency and turning the synthetic jet actuator on and off at a second frequency. The synthetic jet actuator interacting with a fluid flow to alter the fluid flow field.

25 Claims, 7 Drawing Sheets

APPARATUS AND METHOD FOR ENHANCEMENT OF AERODYNAMIC PERFORMANCE BY USING PULSE EXCITATION CONTROL

CROSS-REFERENCE TO RELATED APPLICATIONS

This application is based upon and claims priority to copending U.S. provisional application entitled, "Enhancement of the Aerodynamic Performance of a Thick Unconventional Airfoil Using Pulse Excitation Control via Synthetic Jet Actuators," having Ser. No. 60/142,474, filed Jul. 6, 1999, which is incorporated by reference herein in its entirety.

FIELD OF THE INVENTION

The present invention generally relates to the control of fluid flow about solid surfaces and, more particularly, to fluid flow control through the use of pulse modulated actuators.

BACKGROUND OF THE INVENTION

Manipulation and control of shear flow evolution has tremendous impact for influencing system performance in diverse technological applications, including lift and drag of aerodynamic surfaces, flow reattachment to wings, and aircraft stall management. The fact that shear flows are dominated by the dynamics of a hierarchy of vortical structures, evolving as a result of inherent hydrodynamic instabilities in the flow, suggests control strategies based on manipulation of these instabilities by the introduction of disturbances at the flow boundary. It is generally recognized that suitable actuators having fast dynamic response and relatively low power consumption are the foundation of any scheme for the manipulation and control of such shear flows.

One particular application for shear flow manipulation devices is related to airframes or their lifting surfaces. The shear flow that is generated by an aerodynamic lifting surface presents unique challenges, and manipulation of this shear flow will greatly affect flight performance. It is commonly understood that separation of a free stream flow about a lifting surface is generally not desired. Once the flow about a lifting surface separates, the aerodynamic surface experiences a dramatic decrease in lift force produced and a corresponding dramatic rise in the drag force generated by the aerodynamic surface.

Because of the undesirable consequences of flow separation, active manipulation of separated flows over lifting surfaces at moderate and high angles of attack has been the focus of a number of investigations since the early eighties. The goal of such active manipulation is improving the aerodynamic performance and extending an aircraft's flight envelope by inducing complete or partial flow reattachment to the lifting surface.

Some efforts of designers to modify the flow about an aerodynamic surface, and lend to the reattachment of flow over a lifting surface, have centered on injection of momentum into the boundary layer of the flow. For example, the method disclosed by U.S. Pat. No. 4,802,642 to Mangiarotty involves the retardation of a flow's transition to turbulence in order to improve the aerodynamic performance of a lifting surface. The Mangiarotty apparatus propagates acoustic excitation above the Tollmien-Schlichting frequency in an attempt to disrupt Tollmien-Schlichting waves as they begin to form and thereby delay the onset of turbulence. Although the Mangiarotty method changes the drag characteristic of a lifting surface, the mean velocity field and thus apparent aerodynamic shape of the surface, remains unchanged.

Such devices as slots and fluid jets have also been used to inject momentum into the boundary layer in order to prevent flow separation. Although effective at delaying flow separation, none of these devices alter the apparent aerodynamic shape or mean velocity field of a given aerodynamic surface. Additionally, the locus of the flow stagnation points remain largely unchanged.

More recently, synthetic jet actuators have been developed for the control and manipulation of shear flows. Synthetic jet actuators are described in U. S. Pat. No. 5,758,823 to Glezer et al., issued Jun. 2, 1998, which is incorporated herein by reference. As explained in the Glezer et al. patent, a synthetic jet actuator, in its most simple form, comprises a housing defining an internal chamber. An orifice is present in a wall of the housing. The actuator further includes a mechanism in or about the housing for periodically changing the volume within the internal chamber. As the volume of the chamber is increased, ambient fluid. is drawn into the chamber. As the volume of the chamber is decreased, the ambient fluid in the chamber is ejected such that a series of fluid vortices is generated and projected in an external environment, out from the orifice of the housing. These vortices move away from the edges of the orifice under their own self-induced velocity. As the vortices travel away from the orifice, they synthesize a jet of fluid, a "synthetic jet," through entrainment of additional ambient fluid.

It has been discovered that a synthetic jet actuator may be embedded in a solid body, or surface, with the jet orifice built into the body/surface. The interaction of a free stream fluid flow about the body with a synthetic jet stream will change the overall fluid flow field around the solid body. In fact, a synthetic jet actuator operated in a lifting surface will alter the apparent aerodynamic shape of the surface. This phenomenon is fully described in U. S. Pat. No. 5,957,413 to Glezer et al., issued Sep. 28, 1999, which is hereby incorporated herein by reference.

It has been discovered that the effectiveness of synthetic jet actuators are controlled and/or limited by certain parameters. Particularly, placement and strength of these jet actuators are important. Synthetic jet actuators, when used on a wing, should be placed near the point on the wing where the flow is expected to separate. Placement away from this point will reduce the effectiveness of the jet actuator. Adding to these limitations, the jet actuator must have sufficient strength to create the needed alteration of the aerodynamic shape. An undersized synthetic jet actuator is much less effective. Additionally, the ideal strength and/or placement of a synthetic jet actuator may change with flight conditions.

Thus there exists a need in the art to improve the performance of synthetic jet actuators. There also exists a need to optimize the performance of synthetic jet actuators that are underpowered, either due to changes in flight conditions or due to inherent limitations on the system. The apparatus and method described herein, in both the text and figures, seeks to remedy the problems in the art and provide a method and apparatus for improving the performance of actuators, and particularly, synthetic jet actuators.

SUMMARY OF THE INVENTION

Briefly described, the present invention involves the use of actuators, particularly synthetic jet actuators for modification of fluid flow about the various surfaces. The present invention is primarily concerned with pulse modulating synthetic jet actuators in order to take advantage of transient responses and thereby improve synthetic jet actuator performance. However, many different types of actuators may benefit from the pulse modulation technique described herein.

One aspect of the apparatus disclosed below is a system for modifying an aerodynamic property of an aerodynamic surface in a fluid flow. The fluid flow could comprise a free stream fluid flow, or an internal fluid flow, such as in a nozzle, diffuser, or compressor. The system preferably comprises a synthetic jet actuator embedded in an aerodynamic surface. In one aspect of the preferred embodiment, the aerodynamic surface may be a wing of an aircraft. The synthetic jet actuator typically has a jet housing defining a chamber, where the chamber is in fluid communication with the fluid. This fluid communication may be accomplished via an orifice in a wall of the housing. Additionally, a portion of said housing is preferably moveable such that the volume of the chamber can be adjusted. This portion of the housing may comprise a flexible diaphragm. The system also comprises a device for changing the position of the moveable portion of the housing. This may comprise a piezoelectric actuator and a power supply. The system also comprises a controller for automatically cycling the position changing device between on and off at a predefined frequency. In this way, the synthetic jet actuator is pulse modulated in order to enhance the synthetic jet actuator's performance.

In another aspect, the invention may been seen as a method of controlling a synthetic jet actuator. The method preferably comprises the steps of driving a synthetic jet actuator at a first frequency and turning the synthetic jet actuator on and off at a second frequency.

Other systems, methods, features. and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, like reference numerals designate corresponding parts throughout the several views.

FIG. 4B is a schematic cut away side view of the apparatus of FIG. 1 after the synthetic jet actuator has been turned on.

FIG. 6 is also a plot of the phase-averaged incremental change in normalized circulation with respect to the unforced flow condition of the apparatus of FIG. 1, where the synthetic jet actuator diaphragm is oscillated at $F^+=3.3$, $\alpha=17.5°$.

DETAILED DESCRIPTION OF THE PREFERRED EMBODIMENTS

It will be obvious to those skilled in the art that many modifications and variations may be made to the preferred embodiments of the present invention as described hereafter without substantially departing from the spirit and scope of the present invention. All such modifications and variations are intended to be included herein within the scope of the present invention, as is set forth in the appended claims.

For example, the pulse modulation techniques described below are described with relation to synthetic jet actuators. However, the pulse modulation techniques, which are very beneficial to the synthetic jet actuators, are also applicable to many other types of actuators. Such other actuators are intended to be included within the scope of the present invention.

A. Synthetic Jet Actuator Embedded In A Wing

Figure 1:
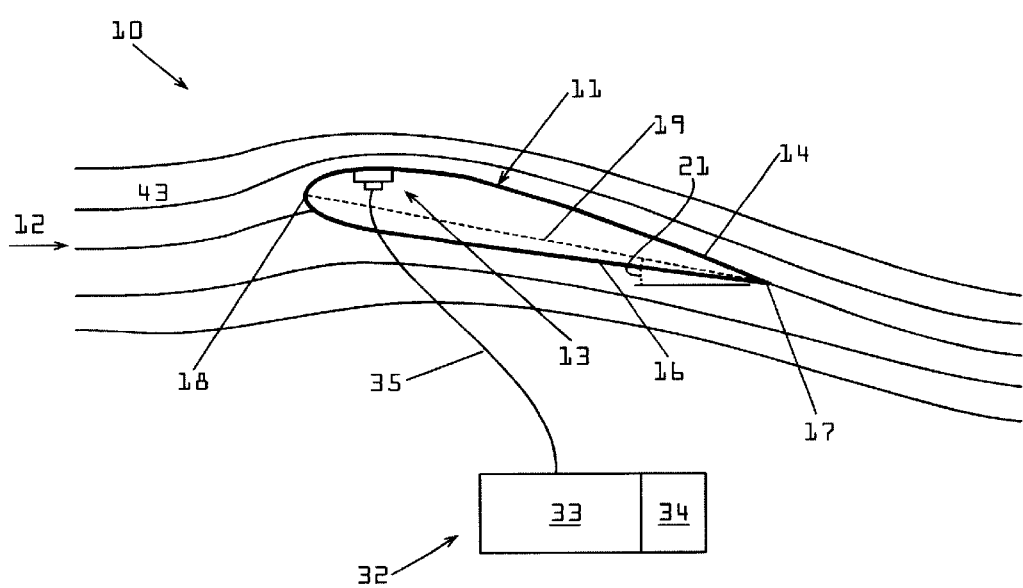
FIG. 1 is a cross-sectional schematic side view of the preferred embodiment of a wing in a free stream flow with a synthetic jet actuator embedded in the wing.

FIG. 1 depicts the preferred embodiment of a system 10 for modification of fluid flow 12 about an aerodynamic surface 11. In the preferred embodiment 10, a synthetic jet actuator 13 is employed to modify the lift and drag characteristics of the aerodynamic surface 11 by preventing stall and/or inducing flow reattachment. The aerodynamic surface 11 typically comprises a wing, or aerodynamic fin. Of course, the aerodynamic surface is not so-limited and may comprise any solid body or solid surface that is placed in a free stream flow. By way of example, the present system 10 could be used along the surface of an aircraft fuselage, or along the surface of an automobile body panel. The present system 10 is also adaptable for altering flow characteristics of internal flows, such as in a nozzle, diffuser, or compressor.

In the preferred embodiment 10, the aerodynamic surface 11 is depicted as a cross-sectional side view of a three-dimensional wing structure in a free stream flow 12. Since the depiction of the aerodynamic surface 11 is two-dimensional, the aerodynamic surface will be referred to as both a wing and an airfoil interchangeably herein. The wing 11 generally comprises an upper surface, or skin 14 and a lower surface, or skin 16. The upper and lower surfaces 14, 16 meet at the wing's trailing edge 17 and at the wing's leading edge 18.

The wing 11 depicted in FIG. 1 comprises an airfoil having a slightly positive camber. The chord line 19 of the airfoil 11 is depicted in FIG. 1 as a dashed line. Of course, the airfoil 11 may be symmetric or of any other camber. The actual natural camber of the aerodynamic surface 11 is not important to the present invention.

As depicted in FIG. 1, the wing 11 is disposed at some angle of attack 21. The particular angle of attack 21 is not important to the present invention, although the angle of attack may affect several parameters of the present invention. However, as depicted in FIG. 1, the angle of attack 21 is approximately 20 degrees. Twenty degrees is not necessarily a preferred angle, as no particular angle of attack is really preferred over any other.

B. Construction Of The Synthetic Jet Actuator

Figure 2A:
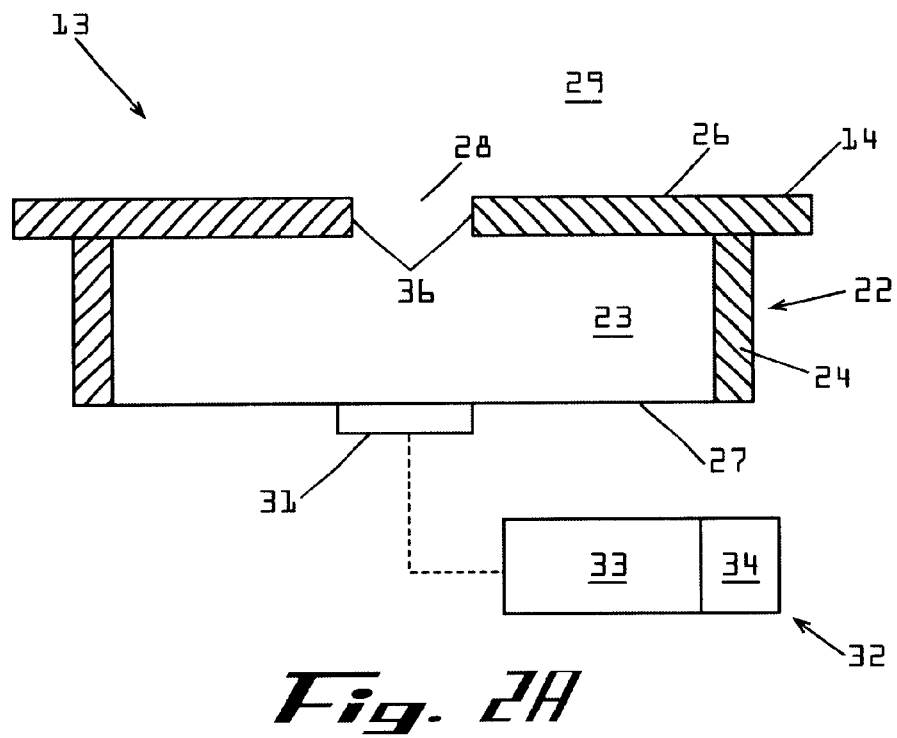
FIG. 2A is an exploded schematic cross-sectional side view of the zero net mass flux synthetic jet actuator of FIG. 1.

In the preferred embodiment 10, a synthetic jet actuator 13 is embedded in the wing 11. FIG. 2A is an exploded side view of the synthetic jet actuator 13 of the system 10 such that the components of the synthetic jet actuator 13 may be better described. The synthetic jet actuator 13 of FIG. 2A comprises a housing 22 defining and enclosing an internal chamber 23. The housing 22 and chamber 23 can take virtually any geometric configuration, but for purposes of discussion and understanding, the housing 22 is shown in cross-section in FIG. 2A to have a rigid side wall 24, a rigid front wall 26, and a rear diaphragm 27 that is flexible to an extent to permit movement of the diaphragm 27 inwardly and outwardly relative to the chamber 23. The front wall 26 has an orifice 28 of any geometric shape. The orifice 28 diametrically opposes the rear diaphragm 27 and connects the internal chamber 23 to an external environment having ambient fluid 29. The walls 24, 26 are typically welded or glued together. The diaphragm 27 is preferably glued to the side walls 24. Of course, the method of adhesion is not critical to the present invention and welding/glue is only the preferred method and not the only method of attachment.

Recall that the synthetic jet actuator 13 is embedded in a wing 11, in the preferred embodiment 10. As a result, the ambient fluid 29 will typically comprise the free stream fluid flow 12 (see FIG. 1). Also because the synthetic jet actuator 13 is embedded in the wing 11, the front wall 26 of the synthetic jet actuator 13 is preferably the same as the upper skin 14 of the wing 11 (see FIG. 1). Thus, in the preferred embodiment, the upper skin 14 of the wing 11 has an orifice 28 therein. In this way, the side wall 24 and diaphragm 27 structure of the synthetic jet actuator 13 can be built directly onto the inside surface of the wing 11. The side walls 24 can be attached to the inner surface of the wing 11 in any suitable manner, but welding is preferred.

In order to operate the synthetic jet actuator 13, the diaphragm 27 is preferably constructed so as to oscillate in time-harmonic motion. While this motion may be effected in a variety of manners, preferably, a piezoelectric actuator 31 is attached to the diaphragm 27. Piezoelectric elements 31 may be attached in any suitable manner, but most commonly they are attached by an adhesive glue. The piezoelectric element 31 should be supplied with power in order to begin vibration. In the preferred embodiment, a control system 32 is connected to the piezoelectric actuator 31 in order to cause the piezoelectric element 31 to vibrate. The control system 32 is preferably connected via standard wiring. Note that the control system 32 is depicted schematically in the drawings and the line 35 connecting the control system 32 the piezoelectric actuator 31 only represents a connection between the two components. The actual location of the control system 32 and the connecting line 35 will be different from as depicted and the figure is depicted schematically for clarity.

The control system 32 of the preferred embodiment comprises an amplifier 33 and a computer 34. In the preferred embodiment 10 of a pulse modulated synthetic jet actuator 13, as will be fully described below, the computer 34 generates a modulated sine wave and sends this waveform to the amplifier 33. The modulated sine wave is preferably generated by first constructing a sine wave of high frequency and then constructing a TTL signal (basically a square wave of values zero and five) at a lower frequency. The product of these is the modulated sine wave for the amplifier 33.

Upon receiving the modulated sine wave from the computer 34, the amplifier 33 generates a power output to the piezoelectric actuator 31 via connecting line 35. This power supplied by the amplifier 33 causes the piezoelectric actuator 31 to vibrate in a manner corresponding to the modulated sine wave, and thereby move the diaphragm 27 in time-harmonic motion.

The control system 32 may be housed in the wing 11; however, it is preferred that the control system 32 be housed in the fuselage of the aircraft (not depicted) and connected to the synthetic jet actuator 13 via wiring installed in the interior of the wing 11.

Of course, the generation of the electrical power to the piezoelectric actuator 31 can be accomplished and controlled by any suitable device, for example but not limited to, a signal generator may serve the same purpose. Of course, it is preferred that the control system 32, in whatever embodiment is selected, has the capability of causing the diaphragm 27 to oscillate at a range of predefined frequencies and have the capability of selectively turning on and off the power to the piezoelectric actuator 31 at a range of predefined frequencies.

The method of causing the diaphragm 27 to modulate is not limited in the system 10 described herein. As an example of an alternative method of causing diaphragm motion, the diaphragm 27 may be equipped with a metal layer that acts as a first electrode, and a metal second electrode may be disposed adjacent to, but spaced from the metal layer so that the diaphragm 27 can be moved via an electrical bias imposed between the electrode and the metal layer. Generally, a positive charge is imparted to one electrode and a negative charge to the other electrode. The attractive force between the two electrodes can be harnessed and used to oscillate the diaphragm 27. This method of actuation may be referred to as electrostatic actuation.

As another alternative to the use of a diaphragm 27 as a wall of the housing 22, one wall of the housing 22 could comprise a piston structure. Thus, the volume of the chamber 23 could be altered via control of the piston. In this configuration, the control system 32 would supply power to the piston and cause the piston to move into and out of the chamber 23 in periodic fashion.

C. Operation Of The Synthetic Jet Actuator

Figure 2B:
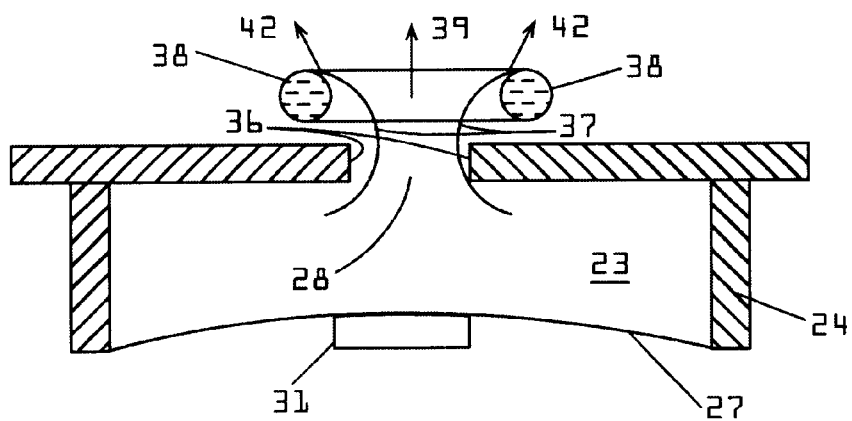
FIG. 2B is a schematic cross-sectional side view of the synthetic jet actuator of FIG. 2A depicting the jet as the control system causes the diaphragm to travel inward, toward the orifice.

The operation of the synthetic jet actuator 21 will now be described with reference to FIG. 2B and FIG. 2C. FIG. 2B depicts the synthetic jet actuator 13 as the diaphragm 27 is controlled to flex into the chamber 23. The chamber 23 has its volume decreased and fluid is ejected through the orifice 28. As the fluid exits the chamber 23 through the orifice 28, the flow separates at sharp orifice edges 36 and creates vortex sheets 37, which roll into vortices 38 and begin to move away from the orifice edges 36 in the direction indicated by arrow 39.

Figure 2C:
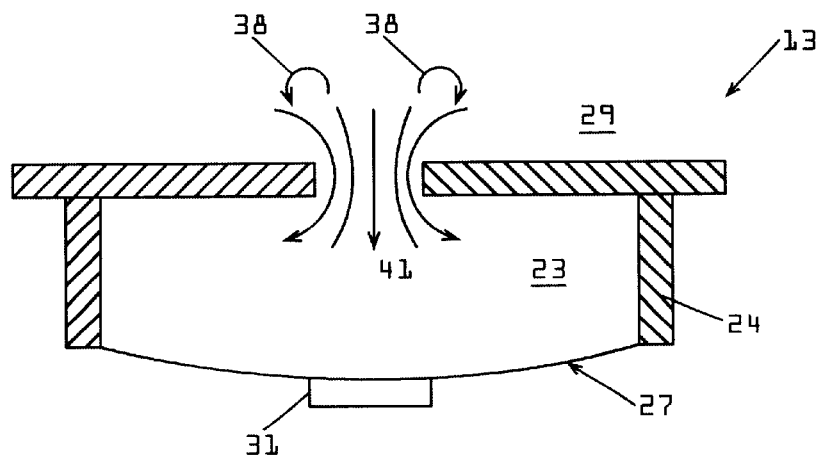
FIG. 2C is a schematic cross-sectional side view of the synthetic jet actuator of FIG. 2A depicting the jet as the control system causes the diaphragm to travel outward, away from the orifice.

FIG. 2C depicts the synthetic jet actuator 13 as the diaphragm 27 is controlled to move outward with respect to the chamber 23. The chamber 23 has its volume increased and ambient fluid 29 rushes into the chamber 23 as depicted by the set of arrows 41. The diaphragm 27 is controlled by the control system 32 (FIG. 2A) so that when the diaphragm 27 moves away from the chamber 23, the vortices 38 are already removed from the orifice edges 36 and thus are not affected by the ambient fluid 41 being drawn into the chamber 23. Meanwhile, an ambient fluid jet 42 is synthesized by the vortices 38. The vortices 38 create the ambient fluid jet 42 by entraining ambient fluid 29, due to their rotation, from large distances away from the orifice 28.

Referring back to FIG. 1, in the preferred embodiment 10, the orifice 28 of the synthetic jet actuator 13 is positioned in order to be flush with the upper skin 14 of the wing 11. The location of the orifice 28 along the airfoil skin 14 can be determined based on the particular effect on the flow 12 desired. As indicated above, the airfoil 11 is typically placed in a free stream fluid flow 12. The flow of the fluid 12 about the airfoil 11 is depicted by the set of streamlines 43.

When the synthetic jet actuator 13 is operational, the synthetic jet actuator 13 forms a fluid flow as depicted by arrow 42 in FIG. 2B. Because the synthetic jet actuator 13 does not inject any new fluid into the free stream flow 12, a closed recirculating flow region is formed adjacent to the airfoil skin 14. The recirculating flow region is closed and modifies the apparent aerodynamic shape of the airfoil. Of course, the modification of the aerodynamic shape of the airfoil results in alteration of the flow about the airfoil, alteration of the streamlines 43, and alteration of the aerodynamic characteristics of the airfoil. In fact, as will be explained in more detail below, if the flow about the wing 11 is detached, simply turning on the synthetic jet actuator 13 may cause the flow 12 to reattach to the wing surface 14. In short, actuation of the synthetic jet actuator 13 in the airfoil 11 leads to flow reattachment and the establishment of a higher (positive) lift force on the airfoil 11, which is accompanied by a change in the vorticity flux and a net increase in circulation.

Separation control through the use of synthetic jet actuators 13, as outlined above, results in a substantial increase in the stall margin of an airfoil 11 at high angles of attack 21 with a significant improvement in the lift and a corresponding reduction in pressure drag. However, the effectiveness of a synthetic jet actuator 13 is affected by both the positioning and the strength of the jet actuator 13 for a given angle of attack 21. For example, as the distance between the synthetic jet actuator 13 and the separation line is decreased, the power required to effect reattachment is reduced. Similarly, as the distance from the separation line is increased, the power required is also increased.

D. Synthetic Jet Actuator Performance Enhancement: Optimizing The Frequency Of Synthetic Jet Actuator Operation The frequency at which the diaphragm 27 is driven by the control system 32 also has a significant impact on the effectiveness of the synthetic jet actuator. Previous work on airfoil separation control has primarily emphasized actuation frequencies that were typically of the same order as the natural shedding frequency of the separated flow over the airfoil (i.e., $F^+=O(1)$) regardless of the choice of actuators. As will be explained in detail below, the desired frequency of operation for the diaphragm 27 is approximately at least an order of magnitude larger than the natural shedding frequency (i.e., $F^+=O(10)$).

It has also been discovered that the synthetic jet actuator 13 of FIG. 1 works most efficiently and effectively if the synthetic jet actuator 13 is tuned such that the desired frequency of operation, in this case $F^+=O(10)$, is also the resonant frequency of the synthetic jet actuator 13. The preferred method sizing a synthetic jet actuator 13 begins with determining the natural shedding frequency of the airfoil 11 to be used. In a general sense, the natural shedding frequency can be determined from the chord of the airfoil 11 and the free stream velocity of the flow 12. The natural shedding frequency is understood to exhibit the following relationship:

$$f_s \; ^{U\infty}\!/_c$$

Where $f_s$ is the natural shedding frequency, $U_\infty$ is the free stream fluid velocity, and c is the chord length of the airfoil 11.

Once the shedding frequency is determined, the actuator designer may then set the frequency at which the actuator diaphragm 27 will be driven. As stated above, the preferred frequency of actuation as at least ten times the value of the natural shedding frequency (i.e., $F^+=O(10)$). So, the preferred size of the synthetic jet actuator 13 is set such that the resonant frequency of the synthetic jet actuator 13 is on the order of $F^+=O(10)$.

The resonant frequency of the synthetic jet actuator 13 may be determined from the material properties of the piezoelectric element 31 and the diaphragm 27 in combination with the volume of the chamber 23. The chamber 23 has a specific resonant frequency that can be determined mathematically or experimentally. The resonant frequency of the entire actuator 13 is a function of the volume size, the material of the piezoelectric element/diaphragm, and the clamping method of the piezoelectric element 27 to the housing 24. As the material properties are typically set, it is easiest to tune the actuator by adjusting the size of the chamber 23.

As stated, the preferred frequency of operation of the synthetic jet actuator is at an order of magnitude larger than the natural shedding frequency of the airfoil. It will now be explained why this frequency of operation is preferred.

Figure 3:
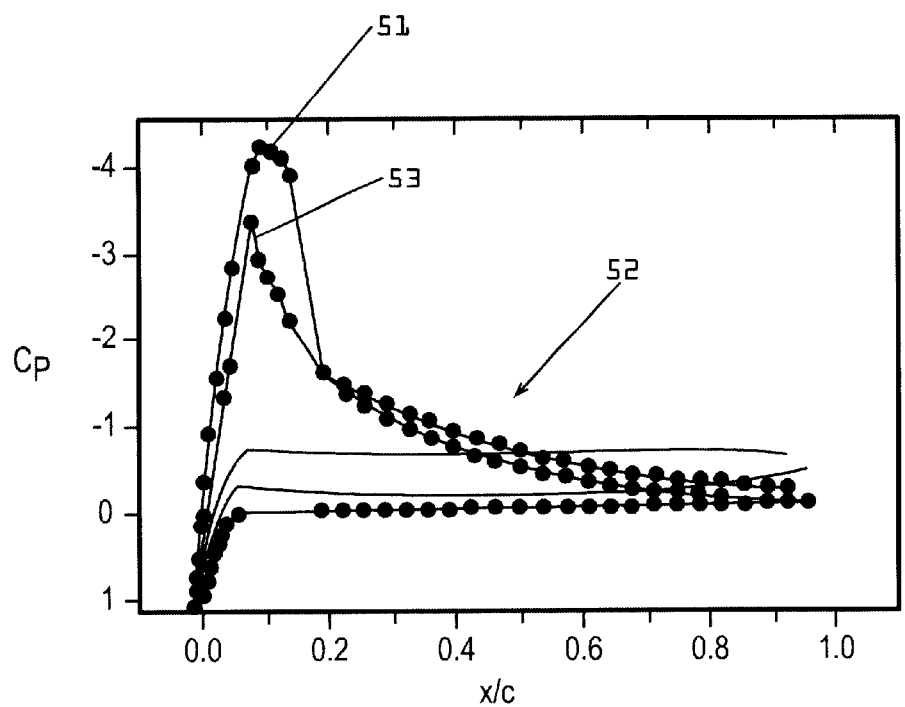
FIG. 3 is a plot of the pressure coefficient distribution for different frequencies of operating the flexible diaphragm of the synthetic jet actuator of FIG. 1.

FIG. 3 is a plot of the pressure coefficient distributions around the airfoil 11 of the preferred embodiment 10 when the synthetic jet actuator 13 is driven at approximately the natural shedding frequency ($F^+=O(1)$), ten times the natural shedding frequency ($F^+=O(10)$), and in the absence of synthetic jet actuator 13 operation. For purposes of this disclosure, a synthetic jet actuator 13 is "driven" with a sinusoidal waveform with a certain frequency by causing the diaphragm 27 to oscillate at that frequency.

The pressure coefficient is set forth along the vertical, y-axis while the normalized distance along the length of the airfoil 11 is set forth along the horizontal, x-axis. The distance is expressed as a percent of chord traversed. For $F^+=O(10)$, the pressure distribution exhibits a large suction peak 51 near the leading edge on the suction side of the airfoil 11 followed by a rapid recovery 52 of the pressure towards the trailing edge 17. When low frequency forcing ($F^+=O(1)$) is used, the pressure distribution exhibits a smaller and sharper suction peak 53 near the leading edge 18, and as a result, the contribution of this peak to the lift is smaller than for the high frequency forcing. Downstream of the low frequency suction peak 53 the pressure difference between the suction and pressure sides is larger than for high frequency forcing resulting in a larger contribution to lift, but also a larger contribution to pressure drag.

Figure 4A:
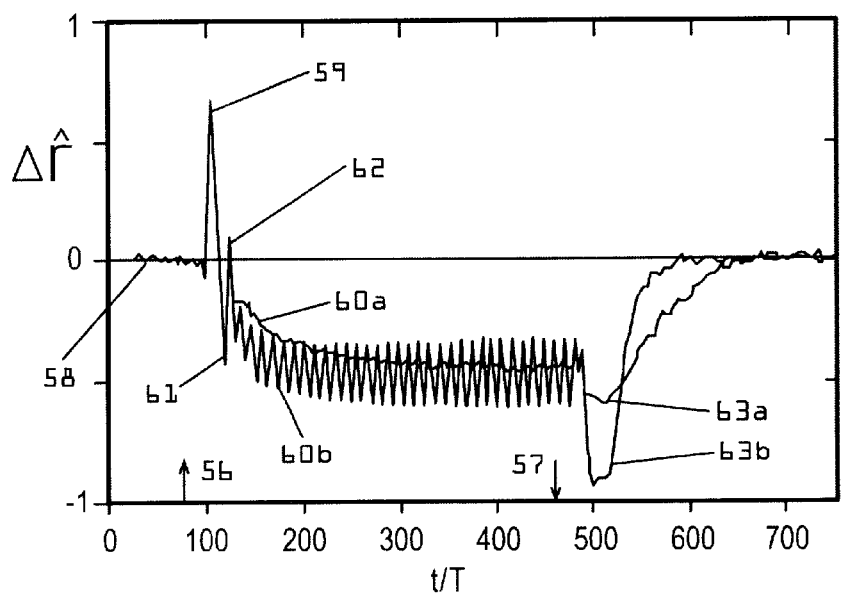
FIG. 4A is a phase-averaged plot of the incremental change in normalized circulation with respect to the unforced flow condition of the apparatus of FIG. 1, for $\alpha=17.5°$ and $F^+=0.95$ (60b), and $F^+=10$ (60a).

In short, operation of the synthetic jet actuator 13 at approximately $F^+=O(10)$ yields better performance from a lift-to-pressure drag ratio perspective. For this reason alone, it may be preferred to operate the synthetic jet actuator 13 of the preferred embodiment 10 at a frequency approximately ten times as high as the natural shedding frequency of the airfoil 11. FIG. 4A demonstrates an additional reason why high frequency forcing may be preferable.

FIG. 4A also addresses the differences between low and high frequency actuation of the synthetic jet actuator 13 of the preferred embodiment 10. FIG. 4A shows the temporal variations in the aerodynamic loads via phase averaged circulation for $F^+=O(1)$ and $F^+=O(10)$ (using curves 60b and 60a, respectively). Change in the normalized circulation with respect to the unforced flow condition is represented along the vertical. y-axis. Normalized circulation may be reflected by the equation: $\hat{\Gamma}=\Gamma/(U_0 \cdot c)$. A normalized time parameter is depicted along the horizontal, x-axis. where T is the period time of the actuation frequency. The synthetic jet actuator 13 is turned on at the up arrow 56 and turned off at the down arrow 57.

Note that at time t/T<75, before the first arrow 56, the change in the normalized circulation with respect to the unforced flow condition is approximately zero. Obviously, with no change in the circulation about the airfoil 11, there is no change in the lift. Upon turning on the synthetic jet actuator 13, the flow 12 reattaches and the lift force increases, as reflected by the negative change in circulation values generated from approximately t/T=200 to t/T=450. However, when flow reattachment begins, the change in the normalized circulation exhibits a transient condition for both control frequencies. Note that there is a sharp positive peak 59 followed by a sharp negative peak 61 and a smaller positive peak 62. Then, for the high frequency forcing, the circulation ultimately reaches a steady level. In contrast, low frequency forcing results in oscillations of $\Delta\hat{\Gamma}$ at the forcing frequency with peak-to-peak fluctuations of up to 45% of the mean level for the attached flow. It can also be noted that when the synthetic jet actuator 13 is turned off 57, both plots show another transient response. The high frequency plot shows a slight negative peak 63a and the low frequency forcing plot shows a large negative peak 63b.

FIG. 4A demonstrates an important distinction between operation of the synthetic jet actuator 13 at a frequency of the same order as the natural shedding frequency, $F^+=O(1)$, and at the preferred frequency, $F^+=O(10)$. When the synthetic jet actuator 13 is operated at $F^+=O(10)$, the flow 12 about the airfoil 11 will re-attach to the airfoil 11 and several coherent vortical structures at the operating frequency of the synthetic jet actuator 13 will form along the upper skin 14 of the airfoil 11. It is noted however, that these vortices quickly lose their identity and vanish well before they reach the trailing edge 17 of the airfoil 11.

When the actuation frequency is $F^+=O(1)$, the reattachment of the flow 12 is characterized by the formation of large vortical structures that scale with the chord 19 of the airfoil 11 and persist well beyond the trailing edge 17 of the airfoil 11. It appears that because the formation frequency of these vortices couples with the natural shedding frequency of the airfoil 11, these vortices are actually enhanced with downstream distance. It is the formation and shedding of these vortical structures that leads to time-periodic variation in lift, as is shown graphically in FIG. 4A.

In order to minimize the variations in circulation (and consequently the lift force) exhibited in FIG. 4A, the synthetic jet actuator 13 of the preferred embodiment 10 should preferably be operated at a frequency at least an order of magnitude larger than the natural shedding frequency of the airfoil 11. The fluctuations of circulation caused by the low frequency forcing are not generally desirable. It is preferable that the circulation generated by the synthetic jet actuator 13 attain and maintain an approximately constant level during actuator 13 operation. Thus, once again, operation of the synthetic jet actuator 13 of the preferred embodiment 10 at higher frequencies is preferred.

E. Further Performance Enhancement: Pulse Modulation Of Synthetic Jet Actuators i. Basis For Pulse Modulation FIG. 4A also demonstrates an important feature of the flow dynamics associated with controlled separation. The discussion will now focus primarily on the case where the diaphragm 27 of the synthetic jet actuator 13 is driven at a frequency much greater than the natural shedding frequency of the airfoil 11. In FIG. 4A, the "spikes" at approximately t/T=100 (59) and the slight negative peaks at approximately t/T=500 (63a, 63b) are important features of any actuation control methodology that can be exploited for further improvements in synthetic jet actuator 13 performance.

It is known that when the flow 12 about the airfoil 11 is separated from the upper surface 14 of the airfoil 11, the vorticity distribution in the wake is comprised of a train of vortical structures of alternating sign (clockwise vorticity is taken to be negative) having a nominal passage frequency equivalent to the shedding frequency of the aerodynamic surface 11. Nevertheless, the total vorticity flux across the wake during one period of the unforced shedding frequency is approximately zero. Turning on the synthetic jet actuator. 13 leads to flow reattachment and the establishment of a higher (positive) lift force on the airfoil 11, which must be accompanied by a change in the vorticity flux and a net increase in circulation associated with positive (counter-clockwise) vorticity.

However as demonstrated clearly in FIG. 4A, following the activation 56 of the synthetic jet actuator 13, a strong clockwise vortex, indicating a reduction in lift 59, is generated by the actuator 13 and shed along the upper surface 14 of the airfoil 11. This strong negative vortex is followed closely by a stronger counter-clockwise (positive) vortex, indicating the re-establishment of lift and shown graphically in FIG. 4A as the peak 61. These two large vortices 59, 60 are followed by a series of smaller vortices of alternating signs and diminishing strength. It appears that the reduced wake of the attached airfoil I ultimately reaches a state of symmetric vorticity distribution.

Figure 4B:
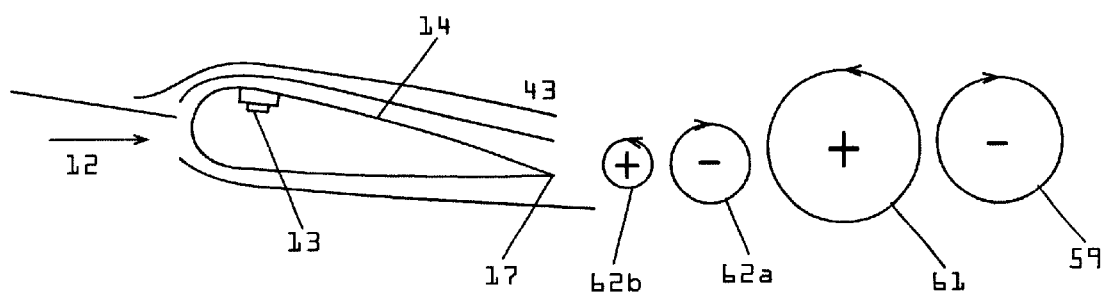

FIG. 4B schematically depicts the vortices shed by the airfoil 11 at start of the synthetic jet actuator 13. The vortices are numbered to correspond to the peaks in FIG. 4A, as described above. FIG. 4B demonstrates schematically the shedding of the "trapped" vorticity of the separated flow 59, which is closely followed by the "starting vortex" 61. These two vortices are followed by a train of vortices of alternating signs and diminishing strength 62a, 62b to re-adjust the flow 12 around the airfoil 11.

When the synthetic jet actuator 13 of the preferred embodiment 10 is turned off 57, the flow 12 separates again and the airfoil 11 loses its lift. This reduction in lift is accompanied by a decrease in circulation and the shedding of negative (clockwise) vorticity, as shown in FIG. 4A as the change in circulation tends to zero after the down arrow 57. However, immediately following the termination 57 of the control, a counter-clockwise vortex, indicating a momentary increase in lift is emitted along the upper surface 14 of the airfoil 11 before the separated vorticity field is established. This large counter-clockwise vortex is graphically depicted as the positive peak in change in circulation 63a, 63b in FIG. 4A.

The increase in the circulation at the end of synthetic jet actuator 13 operation is one key to optimizing the performance of the synthetic jet actuator 13, even when the streamwise placement of the actuator 13 along the surface 14 of the airfoil 11, or strength of the actuator 13, is sub-optimal. For example, it has been discovered that a relatively small reduction of the strength of the synthetic jet actuator 13 results in only a partially reattached flow 12 and a substantial degradation of the lift generated by the synthetic jet actuator 13. The pressure distribution, when the synthetic jet actuator 13 is relatively weak, exhibits a much smaller suction peak near the leading edge 18 followed by a separation bubble that extends throughout most of the upper surface 14 of the airfoil 11.

It is noteworthy, however, that while the asymptotic levels of the circulation decrease substantially with the actuator momentum, the transients 63a, 63b associated with each control input do not appreciably change. Thus, it has been discovered that a synthetic jet actuator 13 operated at frequencies substantially higher than the natural shedding frequency of the wing 11 are amenable to optimization through pulse modulation and consequently, through exploitation of these transients, that are present even for weak synthetic jet actuators, in order maximize an increase in airfoil lift due to flow reattachment.

Basically, when the synthetic jet actuator 13 is turned off 57, the flow begins to separate from the surface 14 of the airfoil 11. However, flow separation is not instantaneous and, in the transient phase, enough vorticity is accumulated to actually increase the airfoil lift (see 63a, 63b). Thus, if the synthetic jet actuator 13 is pulse modulated at the proper frequency, the synthetic jet actuator 13 can be turned back on before the flow detaches, thereby taking advantage of the transient "spike" in lift 63a, 64b, trap the additional vorticity over the airfoil 11 and cause the flow to stay attached such that the lift does not drop to the levels common when flow is detached.

This phenomenon of an increase in lift following the time when actuation is ceased would be true for other types of actuators in addition to synthetic jet actuators. So, while synthetic jet actuators will greatly benefit from such pulse modulation, other actuators may also be modulated in order to take advantage of this transient affect.

ii. Implementation of Pulse Modulation

In order to improve the performance of the synthetic jet actuator 13 of the preferred embodiment 10 at reduced levels of actuator momentum, the actuator diaphragm 27 resonance waveform (nominally driven at $F^+=O(10)$) is preferably pulse modulated. Further, it is preferred that the period t' and duty cycle û of the modulating pulse train are independently controlled. The duty cycle û is a measure of how long the synthetic jet actuator 13 is operational.

To effectuate pulse modulation of synthetic jet actuators 13, the computer 34 of the control system 32 is preferably programmed to produce a modulated sine wave and send this waveform to the amplifier 33. The modulated sine wave is preferably generated by first constructing a sine wave of high frequency ($F^+=O(10)$) and then constructing a TTL signal at the frequency at which the actuator 13 will be pulsed (this frequency is represented by $f^+$ herein). The two waves are multiplied by each other to generate the modulated sine wave for the amplifier 33. Of course, other waveforms may be used to modulate the synthetic jet actuator 13. For example, the computer 34 may be programmed to use a "saw-tooth" waveform or a triangle waveform.

Upon receiving the modulated sine wave from the computer 34, the amplifier 33 generates a power output to the piezoelectric actuator 3 1. This power supplied by the amplifier 33 causes the piezoelectric actuator 31 to vibrate in a manner corresponding to the modulated sine wave and thereby move the diaphragm 27 in time-harmonic motion, and to pulse according to the frequency $f^+$.

The duty cycle of the pulse frequency $f^+$ is a function of the angle of attack 21 and chord of a given airfoil 11. The frequency $f^+$ at which the synthetic jet actuator is to be modulated is a function of the airfoil angle of attack 21, the free stream fluid velocity, and the chord of the airfoil 11. One having skill in the art can easily determine the optimum modulation frequency $f^+$ as set forth below and in FIGS. 5A–5D. By way of example, for an angle of attack of 17.5 degrees, the preferred duty cycle, û=0.25. For this example, the period (and corresponding frequency) is preferably restricted to approximately t'=0.303 and $f^+32\ 1/t'=3.3$. The selection of these values is demonstrated below.

Figure 5A:
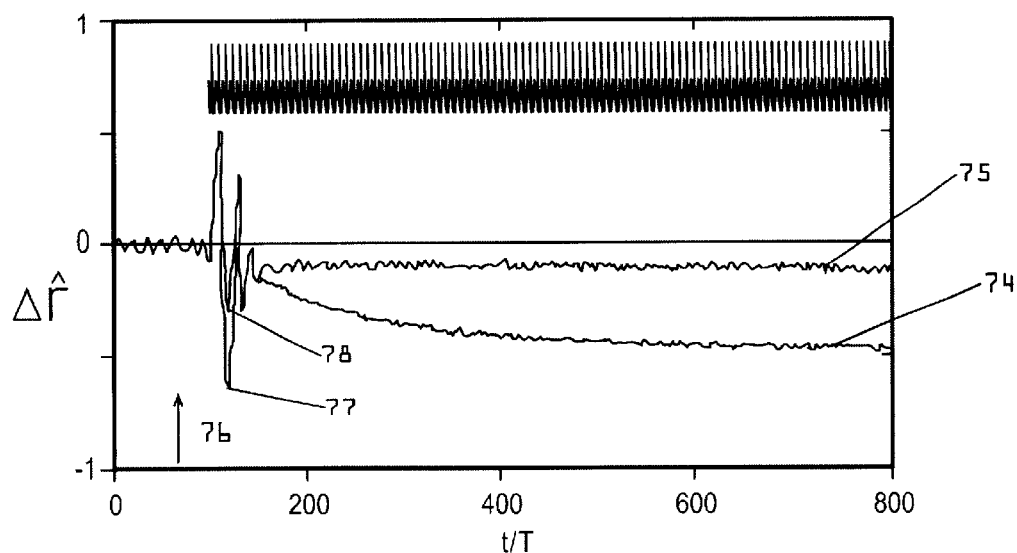
FIG. 5A is a plot of the phase-averaged incremental change of the circulation with respect to the unforced flow condition of the apparatus of FIG. 1, where the synthetic jet actuator diaphragm is oscillated at $F^+=10$, $\alpha=17.5°$, and the synthetic jet actuator is pulse modulated at a frequency $f^+=3.3$.

FIG. 5A is a plot of change in the normalized circulation with respect to the unforced flow condition versus normalized time for the preferred embodiment 10, where the synthetic jet actuator 13 is modulated at a frequency of $f^+=3.3$ (for an angle of attack of 17.5 degrees). The pulse modulated plot is depicted as the line without symbols 74. The synthetic jet actuator 13 of the preferred embodiment 10 is turned on at time where the up arrow 76 is positioned, approximately t/T=75. Note that prior to turning the synthetic jet actuator 13 on (i.e. beginning the time-harmonic oscillation of the diaphragm 27 at $F^+=O(10)$), the change in the normalized circulation is oscillating about a value of zero.

When the synthetic jet actuator 13, under pulse modulation, is turned on, a much attenuated transient response is exhibited. Particularly, note that the plot representing unmodulated synthetic jet actuator 13 operation exhibits a much greater peak 77 than the corresponding plot of the transient response 78 of a pulse modulated synthetic jet actuator 13. Clearly, the fluctuation of lift is much less during this transient phase for pulse modulated synthetic jet actuation. One primary benefit of this feature is that there is much less strain on the aircraft structure during this period.

Note also that the pulse modulated synthetic jet actuator 13 induces a much greater negative change in circulation (and therefore positive lift) on the airfoil 11 in the steady state. In fact, pulse modulation of the synthetic jet actuator 13 yields an increase of ~45% in the lift coefficient (when it reaches steady state) compared to continuous high-frequency excitation 75.

Figure 5B:
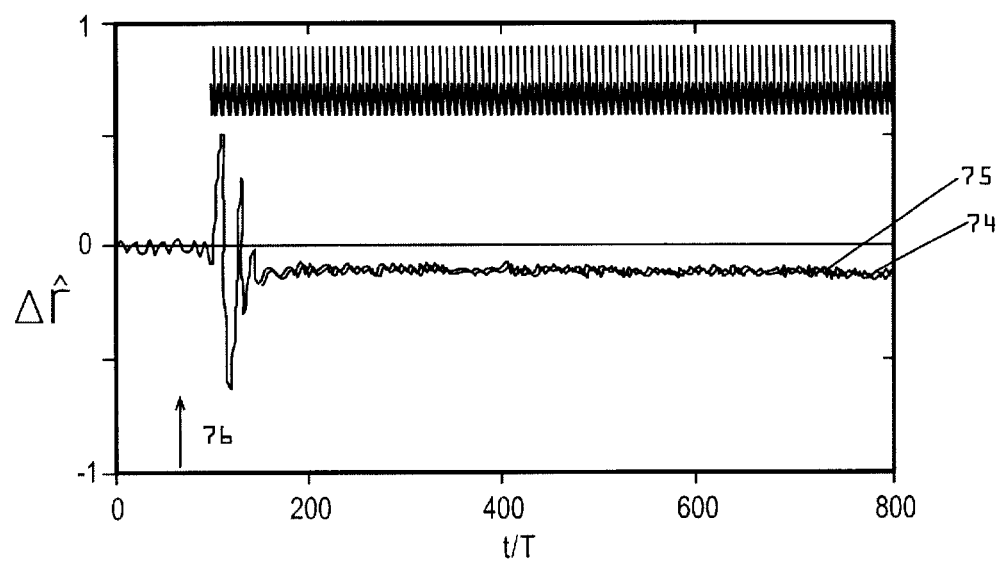
FIG. 5B is a plot of the phase-averaged incremental change of the circulation with respect to the unforced flow condition of the apparatus of FIG. 1, where the synthetic jet actuator diaphragm is oscillated at $F^+=10$, $\alpha=17.5°$, and the synthetic jet actuator is pulse modulated at a frequency $f^+=5.0$.
Figure 5C:
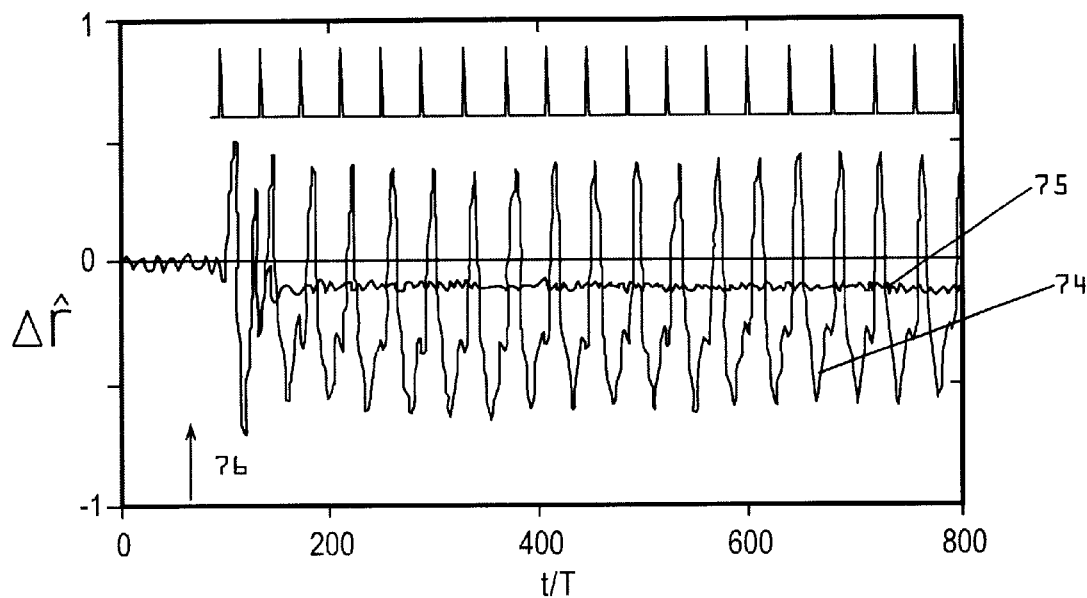
FIG. 5C is a plot of the phase-averaged incremental change of the circulation with respect to the unforced flow condition of the apparatus of FIG. 1, where the synthetic jet actuator diaphragm is oscillated at $F^+=10$, $\alpha=17.5°$, and the synthetic jet actuator is pulse modulated at a frequency $f^+=0.27$.
Figure 5D:
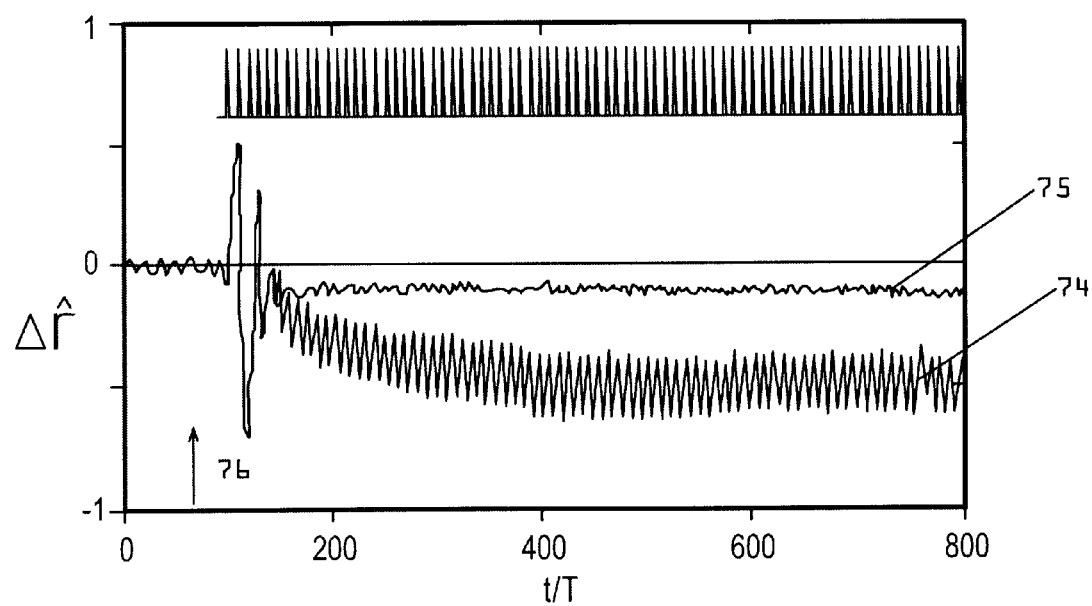
FIG. 5D is a plot of the phase-averaged incremental change of the circulation with respect to the unforced flow condition of the apparatus of FIG. 1, where the synthetic jet actuator diaphragm is oscillated at $F^+=10$, $\alpha=17.5°$, and the synthetic jet actuator is pulse modulated at a frequency $f^+=1.1$.

The frequency $f^+=3.3$ is the preferred frequency because, for the specific preferred embodiment described herein, frequencies higher or lower than this value are generally not as effective at increasing lift. Through experimentation, one with skill in the art will determine if this frequency is appropriate for his/her particular application. The inventors have determined that, for most embodiments, the preferred modulation frequency, f+, is of the same order of magnitude as the natural shedding frequency, or less. For example, FIG. 5B depicts the situation where the modulating frequency is increased to f+=5 for the preferred conditions set forth above. The time between successive pulses of the modulating wave train is too short to capture the unsteady vortical structures. The effectiveness of the modulation is minimal and the circulation returns to the same levels obtained with a continuous synthetic jet actuator operation.

On the other hand, if the modulation frequency is set to a value of f+=0.27 (FIG. 5C), corresponding to the "natural" passage frequency of the vortices during the initial (transient) stages of the reattachment/separation processes, the results are also less than ideal. The resulting quasi-steady circulation exhibits oscillations that are similar in magnitude and duration to the transient stages of the reattachment with shedding of similar vortical structures. The phase of each pulse of the modulating wave train is timed so that it re-triggers reattachment before the flow separates again. Note that the circulation exhibits low-frequency variations (having a period of the order of 60T).

When f+ is increased to 1.1 the elapsed time between pulses within the modulating wave train is decreased (FIG. 5D) and the large oscillations in the circulation are substantially attenuated. This suggests that the modulating pulses are timed to prevent continuous shedding of large vortical structures and the corresponding variations in circulation. The recovery of an asymptotic circulation of approximately $\Delta\hat{\Gamma}=0.45$ also suggests that the forcing allows the accumulation and maintenance of (clockwise) vorticity on the suction side 14 of the airfoil 11 even though the reattachment is unsteady and the circulation oscillates with peak-to-peak variations of 42% of its asymptotic mean level.

Thus, it can be seen that pulse modulation of the synthetic jet actuator 13 of the preferred embodiment 10 greatly improves the performance of the synthetic jet actuator 13. This may be especially advantageous if the synthetic jet actuator 13 is not at the optimum location on the airfoil 11, or is sub-optimally powered.

Interestingly, an increase in lift, similar to that shown in the depiction of the change in the normalized circulation in FIG. 5A, may not be obtained by simply oscillating the diaphragm 27 of the synthetic jet actuator 13 of the preferred embodiment 10 with a sine wave having a frequency F+=f+=3.3. Although this would bypass the need for pulse modulation, it simply does not work.

Figure 6:
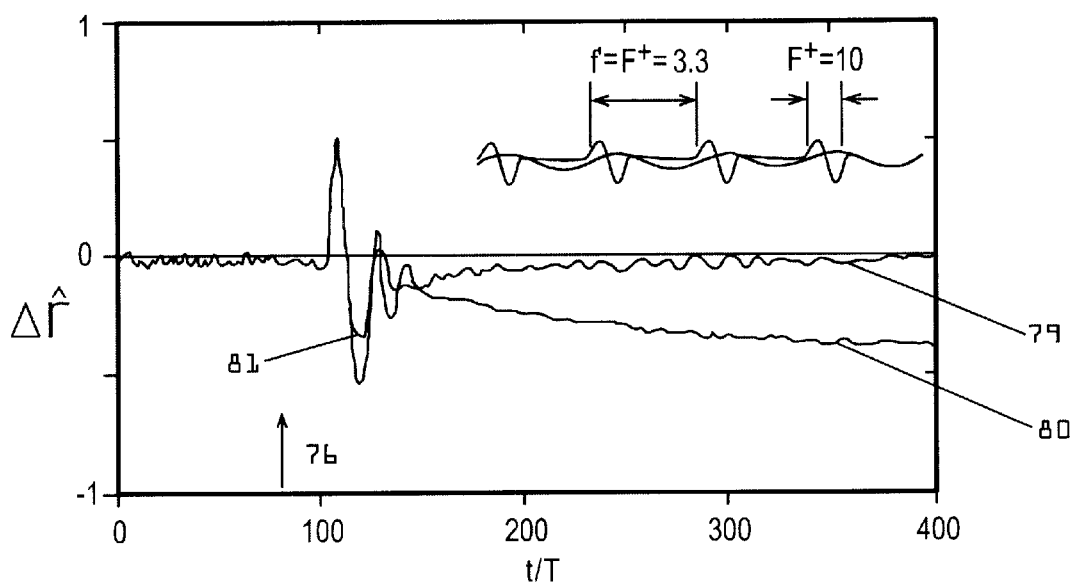
FIG. 6 is a plot of the phase-averaged incremental change in normalized circulation with respect to the unforced flow condition of the apparatus of FIG. 1, where the synthetic jet actuator diaphragm is oscillated at $F^+=10$, $\alpha=17.5°$, and the synthetic jet actuator is pulse modulated at a frequency $f^+=3.3$.

FIG. 6 depicts a plot of phase-averaged change in normalized circulation with respect to the unforced flow condition for both continuously forced synthetic jet actuator operation 79 and for pulse modulated synthetic jet actuator operation 80. Note that the continuously forced synthetic jet actuator operation plot 79 represents the situation where the actuator diaphragm is oscillated at a frequency of the same order of magnitude of the natural forcing frequency, F+=3.3. The pulse modulated synthetic jet actuator operation plot 80 represents the situation where the actuator diaphragm 27 is oscillated at frequency of magnitude F+=O(10), and the actuator itself is then pulse modulated at a frequency of f+=3.3. In FIG. 6, the same jet momentum coefficient ($c_\mu$) is used for both the continuously forced jet actuator and the pulse modulated jet actuator. FIG. 6 also shows the input waveforms that lead to identical jet momentum coefficient ($c_\mu$) over one period of the actuation.

FIG. 6 clearly shows that the pulse modulated synthetic jet actuator 13 yields a much greater increase in normalized circulation than the continuously driven synthetic jet actuator. It is also important to note that the transient response 81 of the pulse modulated synthetic jet actuator 13 is much attenuated.

We claim:

1. A system for modifying an aerodynamic property of an aerodynamic surface in a fluid flow, said system comprising:
    a synthetic jet actuator embedded in the aerodynamic surface, said synthetic jet actuator having a jet housing defining a chamber, wherein said chamber is in fluid communication with the fluid flow and a portion of said housing is moveable for changing a volume of said chamber;
    a means for changing the position of said moveable portion of said housing;
    a controller directing said position changing means to operate at a first predefined frequency and for automatically cycling said position changing means between on and off at a second predefined frequency; and
    wherein cycling said position changing means off causes the fluid flow to partially separate from the aerodynamic surface, the fluid flow entering a transient phase including a counter-clockwise vortex; and
    wherein said second predefined frequency is set such that said position changing means is cycled back on prior to flow separation such that said counter-clockwise vortex is trapped on the aerodynamic surface.

2. The system of claim 1, wherein said position changing means actuates said moveable portion of said housing so as to cause the volume of said chamber to oscillate at said first predefined frequency.

3. The system of claim 2, wherein said first predefined frequency comprises a frequency at least ten times greater than a natural shedding frequency of the aerodynamic surface.

4. The system of claim 3, wherein said second predefined frequency is designed to control flow separation and is of the same order as the natural shedding frequency of the aerodynamic surface or smaller.

5. The system of claim 4, wherein the aerodynamic surface comprises a wing.

6. The system of claim 5, wherein the fluid flow comprises a free stream fluid flow.

7. The system of claim 4, wherein said movable portion of said synthetic jet actuator housing comprises a flexible diaphragm and wherein said position changing means comprises a piezoelectric actuator attached to said flexible diaphragm.

8. The system of claim 7, wherein said controller further comprises:
    an amplifier connected by electrical wiring to said piezoelectric actuator, said amplifier supplying a power output to said piezoelectric actuator; and
    a computer for controlling said power output of said amplifier.

9. A method of controlling a synthetic jet actuator disposed in an aerodynamic surface, said aerodynamic surface with a separated shear layer having a natural shedding frequency, said method comprising the steps of:
    providing a synthetic jet actuator;
    driving said synthetic jet actuator at a first frequency;
    generating a counter-clockwise vortex by momentarily de-energizing said synthetic jet actuator; and
    trapping said counter-clockwise vortex on said aerodynamic surface by energizing said synthetic jet actuator.

10. The method of claim 9, wherein said synthetic jet actuator is de-energized and energized alternately at a second frequency.

11. The method of claim 9, wherein said first frequency is about ten times greater than said natural shedding frequency of said aerodynamic surface.

12. The method of claim 11, wherein said second frequency is designed to control flow separation and is of the same order as said natural shedding frequency of said separated shear layer over said aerodynamic surface or smaller.

13. The method of claim 12, wherein said synthetic jet actuator comprises:
- a jet housing defined by walls, said jet housing having an internal chamber with a volume of fluid and an opening in said jet housing connecting said chamber to an external environment having said fluid;
- a volume changing means for periodically changing said volume within said internal chamber; and
- a control system for controlling the operation of said volume changing means.

14. The method of claim 13, wherein said volume changing means comprises:
- a flexible diaphragm comprising a wall of said jet housing; and
- a piezoelectric actuator attached to said flexible diaphragm for causing said flexible diaphragm to oscillate in time-harmonic motion.

15. The method of claim 14, wherein said control system comprises:
- an amplifier connected to said piezoelectric actuator, said amplifier supplying power to said piezoelectric actuator; and
- a computer for controlling said amplifier.

16. A method for modifying a force generated by an aerodynamic surface, said method comprising the steps of:
- providing an aerodynamic surface disposed in a free stream fluid flow;
- embedding a zero net mass flux actuator in said aerodynamic surface:
- driving said actuator at a first frequency, said actuator emitting a jet of fluid into contact with said free stream fluid flow; and
- turning on and off said actuator at a second frequency,
- wherein said jet of fluid emitted from said actuator interacts with said free stream fluid to alter the force generated by said aerodynamic surface by entrapping a plurality of vortices developed during a transient phase of said free stream fluid that exists between said free stream fluid being attached to said aerodynamic surface and said free. stream fluid being separated from said aerodynamic surface.

17. A method for altering forces generated by an aerodynamic surface in a free stream fluid flow, comprising the steps of:
- providing a synthetic jet actuator built into the aerodynamic surface, said synthetic jet actuator having a jet housing defined by walls, said jet housing having an internal chamber with a volume of fluid and an opening in said jet housing connecting said chamber to the fluidic environment, and a volume changing means for changing said volume within said internal chamber;
- driving said volume changing means at a first frequency such that said volume is changed periodically and said synthetic jet actuator produces a stream of fluid; and
- selectively turning said volume changing means on and off such that said free stream fluid flow partially separates from the aerodynamic surface when said volume changing means is turned off, and said volume changing means is turned on prior to said free stream fluid totally separating from the aerodynamic surface.

18. A method of controlling a fluid flow, said method comprising the steps of:
- providing an actuator, said actuator positioned in the fluid flow to be controlled;
- generating a signal for driving said actuator at a first frequency; and
- turning said driving signal on and off at a second frequency such that the fluid flow exhibits a transient phase comprising at least one counter-clockwise vortex each time said driving signal is turned off and on.

19. The method of claim 18, wherein said actuator comprises a synthetic jet actuator.

20. The method of claim 19, wherein said synthetic jet actuator comprises:
- a jet housing defined by walls, said jet housing having an internal chamber with a volume of fluid and an opening in said jet housing connecting said chamber to an external environment having said fluid;
- a volume changing means for periodically changing said volume within said internal chamber; and
- a control system for controlling the operation of said volume changing means.

21. The method of claim 20, wherein said volume changing means comprises:
- a flexible diaphragm comprising a wall of said jet housing; and
- a piezoelectric actuator attached to said flexible diaphragm for causing said flexible diaphragm to oscillate in time-harmonic motion.

22. The method of claim 21, wherein said control system comprises:
- an amplifier connected to said piezoelectric actuator, said amplifier supplying power to said piezoelectric actuator; and
- a computer for controlling said amplifier.

23. The method of claim 22, wherein said synthetic jet actuator is disposed in an aerodynamic surface, said aerodynamic surface with a separated shear layer having a natural shedding frequency.

24. The method of claim 23, wherein said first frequency is about ten times greater than said natural shedding frequency of said aerodynamic surface.

25. The method of claim 24, wherein said second frequency is less than or equal to a frequency of the same order as said natural shedding frequency of said separated shear layer over said aerodynamic surface.

* * * * *

UNITED STATES PATENT AND TRADEMARK OFFICE
CERTIFICATE OF CORRECTION

PATENT NO.     : 6,412,732 B1
DATED          : July 2, 2002
INVENTOR(S)    : Amitay et al.

It is certified that error appears in the above-identified patent and that said Letters Patent is hereby corrected as shown below:

Column 7,
Line 4, "21" should be deleted and replaced with -- 13 --

Column 8,
Line 25, "$f_s \frac{U\infty}{c}$" should be deleted and replaced with -- $f_s \propto \frac{U\infty}{c}$ --

Column 10,
Line 57, "I" should be deleted and replaced with -- 11 --

Column 11,
Line 47, "64b" should be deleted and replaced with -- 63b --

Column 12,
Line 15, "3 1" should be deleted and replaced with -- 31 --
Line 30, "f⁺321/t'=3.3" should be deleted and replace -- $f^+ = 1/t' = 3.3$ -- with Column 13,
Line 46, "F⁺=f⁺=3 .3." should be deleted and replaced -- $F^+ = f^+ = 3.3$ -- with Column 15,
Line 54, after "free" delete "."

Signed and Sealed this

Twenty-eighth Day of January, 2003

JAMES E. ROGAN
*Director of the United States Patent and Trademark Office*